US012672194B2

(12) United States Patent
Shrivastava et al.

(10) Patent No.: US 12,672,194 B2
(45) Date of Patent: Jun. 30, 2026

(54) SYSTEMS AND METHOD FOR CONFIGURING USER EQUIPMENTS FOR MULTICAST RECEPTION IN A WIRELESS COMMUNICATION SYSTEM

(71) Applicant: Samsung Electronics Co., Ltd., Gyeonggi-do (KR)

(72) Inventors: Vinay Kumar Shrivastava, Bangalore (IN); Sangkyu Baek, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 320 days.

(21) Appl. No.: 18/343,366

(22) Filed: Jun. 28, 2023

(65) Prior Publication Data

US 2024/0008128 A1 Jan. 4, 2024

(30) Foreign Application Priority Data

Jul. 1, 2022 (IN) .............................. 202241038111

(51) Int. Cl.
*H04W 76/20* (2018.01)
*H04W 72/1273* (2023.01)
(Continued)

(52) U.S. Cl.
CPC ....... *H04W 76/20* (2018.02); *H04W 72/1273* (2013.01); *H04W 72/232* (2023.01); *H04W 76/40* (2018.02)

(58) Field of Classification Search
CPC ................. H04W 76/20; H04W 76/40; H04W 72/232; H04W 72/1273; H04W 76/27; H04W 4/06; H04W 72/30; H04W 40/36; H04W 8/20
See application file for complete search history.

(56) References Cited

U.S. PATENT DOCUMENTS

| | | | | |
|---|---|---|---|---|
| 2006/0075119 | A1* | 4/2006 | Hussain | ................ H04L 69/163 |
| | | | | 709/227 |
| 2008/0165795 | A1* | 7/2008 | Baruch | ................... H04L 49/90 |
| | | | | 370/421 |
| 2012/0020250 | A1* | 1/2012 | Sundararaman | ...... H04L 49/101 |
| | | | | 370/256 |

(Continued)

FOREIGN PATENT DOCUMENTS

| | | |
|---|---|---|
| KR | 1020220051887 | 4/2022 |
| KR | 1020220052278 | 4/2022 |

(Continued)

OTHER PUBLICATIONS

Indian Examination Report dated Jun. 9, 2025 issued in counterpart application No. 202241038111, 7 pages.

(Continued)

*Primary Examiner* — Mewale A Ambaye
(74) *Attorney, Agent, or Firm* — The Farrell Law Firm, P.C.

(57) ABSTRACT

The disclosure relates to a 5G or 6G communication system for supporting a higher data transmission rate. Disclosed is a method performed by a user equipment (UE) for a multicast and broadcast service (MBS) in a wireless communication system, including receiving, in a radio resource control (RRC) connected state, from a base station, a radio resource control (RRC) reconfiguration message configuring the UE to perform a multicast MBS reception in an RRC inactive state, receiving, from the base station, an RRC release message including at least one configuration information on a multicast MBS radio bearer (MRB), storing, in the RRC inactive state, the at least one configuration information on the multicast MRB; and receiving a multicast MBS session in the RRC inactive state based on the at least one stored configuration information.

16 Claims, 10 Drawing Sheets

(51) Int. Cl.
  *H04W 72/232*     (2023.01)
  *H04W 76/40*     (2018.01)

(56) References Cited

U.S. PATENT DOCUMENTS

| | | | | |
|---|---|---|---|---|
| 2018/0316690 | A1* | 11/2018 | Cho | H04W 12/106 |
| 2019/0281651 | A1 | 9/2019 | Lee et al. | |
| 2021/0127448 | A1* | 4/2021 | Kadiri | H04W 76/27 |
| 2022/0124463 | A1 | 4/2022 | Zhang et al. | |
| 2023/0262423 | A1 | 8/2023 | Fujishiro et al. | |
| 2023/0284321 | A1* | 9/2023 | Babaei | H04W 68/02 |
| | | | | 370/329 |
| 2023/0328691 | A1* | 10/2023 | Agiwal | H04W 76/27 |
| 2023/0380002 | A1 | 11/2023 | Hong | |

FOREIGN PATENT DOCUMENTS

| | | |
|---|---|---|
| WO | WO 2021/147542 | 7/2021 |
| WO | WO 2022/002830 | 1/2022 |
| WO | WO 2022/078384 | 4/2022 |
| WO | WO 2022/081948 | 4/2022 |
| WO | WO 2022/082588 | 4/2022 |
| WO | WO 2022/082594 | 4/2022 |
| WO | WO 2022/082802 | 4/2022 |
| WO | WO 2022/084537 | 4/2022 |
| WO | WO 2022/085757 | 4/2022 |
| WO | WO-2022078384 A1* | 4/2022 ........... H04W 76/27 |
| WO | WO 2022/124264 | 6/2022 |

OTHER PUBLICATIONS

Vivo, "Discussion on Idle and Inactive Mode UEs", R2-2007037, 3GPP TSG-RAN WG2 Meeting #111 Electronic, Aug. 17-28, 2020, 5 pages.
European Search Report dated Sep. 12, 2025 issued in counterpart application No. 23831837.2-1206, 11 pages.
International Search Report dated Oct. 5, 2023 issued in counterpart application No. PCT/KR2023/008841, 9 pages.

* cited by examiner

FIG. 4

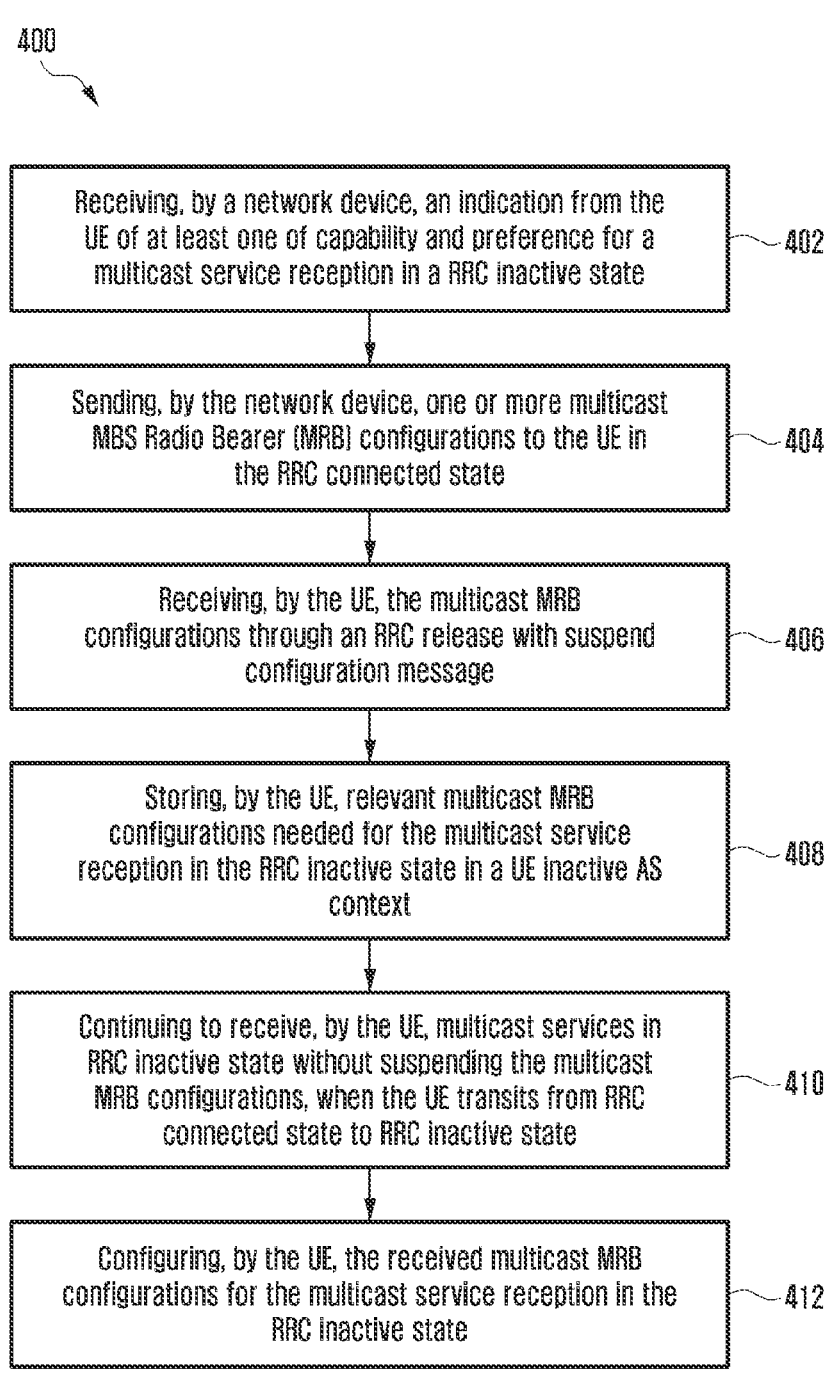

400

| Receiving, by a network device, an indication from the UE of at least one of capability and preference for a multicast service reception in a RRC inactive state | 402 |

| Sending, by the network device, one or more multicast MBS Radio Bearer (MRB) configurations to the UE in the RRC connected state | 404 |

| Receiving, by the UE, the multicast MRB configurations through an RRC release with suspend configuration message | 406 |

| Storing, by the UE, relevant multicast MRB configurations needed for the multicast service reception in the RRC inactive state in a UE inactive AS context | 408 |

| Continuing to receive, by the UE, multicast services in RRC inactive state without suspending the multicast MRB configurations, when the UE transits from RRC connected state to RRC inactive state | 410 |

| Configuring, by the UE, the received multicast MRB configurations for the multicast service reception in the RRC inactive state | 412 |

FIG. 7

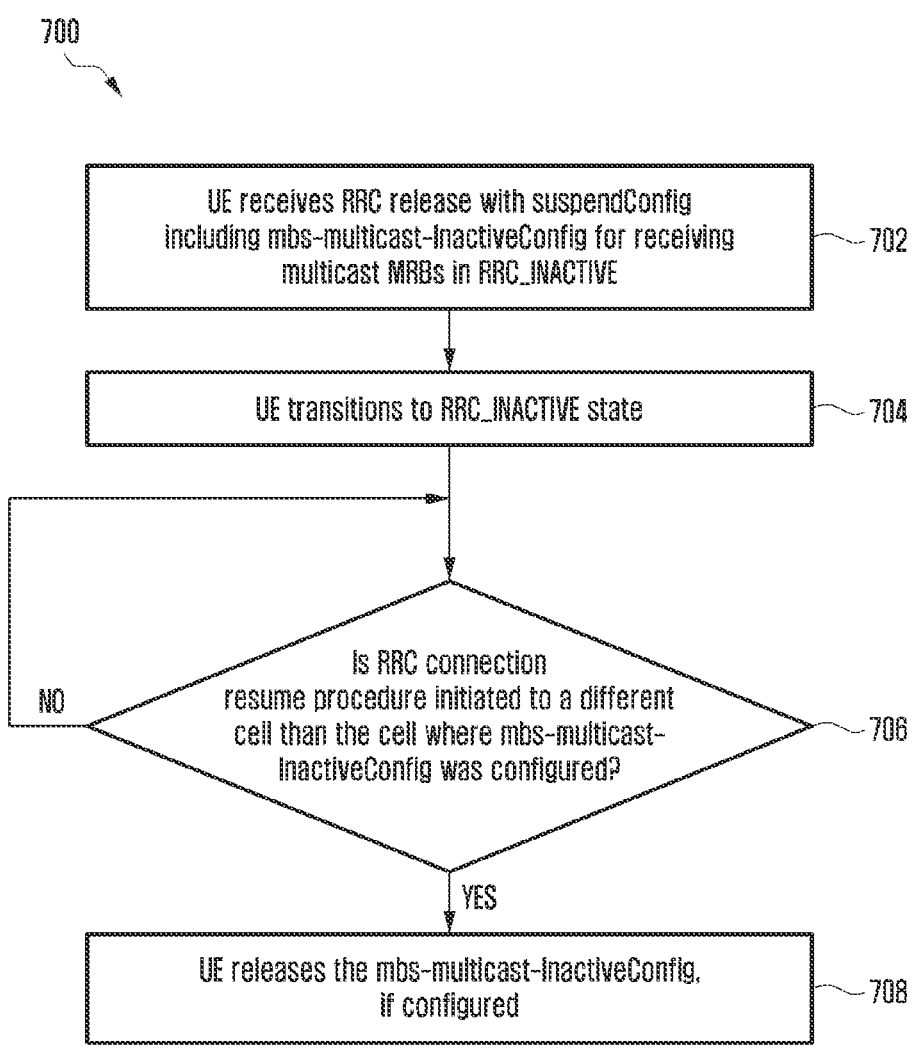

700

UE receives RRC release with suspendConfig including mbs-multicast-InactiveConfig for receiving multicast MRBs in RRC_INACTIVE ~702

UE transitions to RRC_INACTIVE state ~704

Is RRC connection resume procedure initiated to a different cell than the cell where mbs-multicast-InactiveConfig was configured? ~706

NO

YES

UE releases the mbs-multicast-InactiveConfig, if configured ~708

800

UE receives RRC release with suspendConfig
including mbs-multicast-InactiveConfig for receiving
multicast MRBs in RRC_INACTIVE — 802

UE transitions to RRC_INACTIVE state — 804

Is RRC connection
resume procedure initiated? — 806

NO

YES

UE releases the mbs-multicast-InactiveConfig from
Inactive AS context — 808

900

UE receives RRC release with suspendConfig
including mbs-multicast-InactiveConfig for receiving
multicast MRBs in RRC_INACTIVE — 902

UE transitions to RRC_INACTIVE state — 904

Is cell reselection occurring when
mbs-multicast- InactiveConfig is
configured? — 906

NO

YES

UE releases the mbs-multicast-InactiveConfig — 908

SYSTEMS AND METHOD FOR CONFIGURING USER EQUIPMENTS FOR MULTICAST RECEPTION IN A WIRELESS COMMUNICATION SYSTEM

CROSS-REFERENCE TO RELATED APPLICATIONS

This application is based on and claims priority under 35 U.S.C. § 119 to Indian Provisional Patent Application No. 202241038111, filed on Jul. 1, 2022, and Indian Non-Provisional Patent Application No. 202241038111, filed on Jun. 5, 2023, in the Indian Patent Office, the disclosures of which are incorporated herein by reference in their entireties.

BACKGROUND

1. Field

The disclosure relates generally to wireless communication networks, and more particularly, to systems and methods for configuring user equipment (UEs) for new radio multicast and broadcast service (NR MBS) multicast service reception in a radio resource control (RRC) inactive state.

2. Description of Related Art

Fifth generation (5G) mobile communication technologies define broad frequency bands such that high transmission rates and new services are possible, and can be implemented not only in sub 6 gigahertz (GHz) bands such as 3.5 GHz, but also in above 6 GHz bands referred to as millimeter wave (mmWave) bands including 28 GHz and 39 GHz. In addition, it has been considered to implement 6G mobile communication technologies (referred to as beyond 5G systems) in terahertz (THz) bands, such as 95 GHz to 3 THz bands, accomplish achieve transmission rates fifty times faster than 5G mobile communication technologies and ultra-low latencies one-tenth of 5G mobile communication technologies.

At the outset of 5G mobile communication technology development, to support services and to satisfy performance requirements in connection with enhanced mobile broadband (eMBB), ultra reliable low latency communications (URLLC), and massive machine-type communications (mMTC), there has been ongoing standardization regarding beamforming and massive multiple input multiple output (MIMO) for mitigating radio-wave path loss and increasing radio-wave transmission distances in mmWave, supporting numerologies such as operating multiple subcarrier spacings for efficiently utilizing mmWave resources and dynamic operation of slot formats, initial access technologies for supporting multi-beam transmission and broadbands, definition and operation of a bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

There are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

There has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access channel for simplifying random access procedures (2-step RACH for NR). There also has been ongoing standardization in system architecture/service regarding a 5G service based architecture or service based interface for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting such technologies as augmented reality (AR), virtual reality (VR) and mixed reality (MR), 5G performance improvement and complexity reduction by utilizing artificial intelligence (AI) and machine learning (ML), AI service support, metaverse service support, and drone communication.

Such development of 5G mobile communication systems will serve as a basis for developing not only new waveforms for providing coverage in THz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The NR MBS can refer to multicast services, where intended common contents are targeted to a group of UEs. The UEs join the multicast group in the multicast coverage area and broadcast services. This coverage area can be one radio cell or larger.

In the legacy system as defined in third generation partnership project (3GPP) release 17 MBS, a group notification or group paging mechanism is utilized for informing UEs of multicast session "activation in an RRC idle (RRC_IDLE)

state or in an RRC inactive (RRC_INACTIVE) state. Based on reception of the group notification or group paging, the UE transitions to an RRC connected (RRC_CONNECTED) state and starts receiving one or more multicast session(s). However, there may be UEs which receives the multicast session(s) in the RRC_INACTIVE state (for example, 3GPP Release 18 MBS may consider such a scenario).

An issue in the conventional art concerns UEs that are capable of receiving the MBS multicast services in the RRC_INACTIVE state. In the 3GPP legacy system, a multicast service can be received only in the RRC_CONNECTED state. There are no multicast configurations, which can be utilized for the reception of multicast services in any other state apart from the RRC_CONNECTED state. In certain scenarios, an RRC reconfiguration that is used for deactivation of the multicast session releases one or more multicast MBS radio bearers (MRBs) of the MBS, which may result in loss of the multicast configuration. Furthermore, if the UE transitions to the RRC_INACTIVE state, the UE may not receive the multicast service without having a valid multicast configuration.

As such, there is a need in the art for systems and methods to configure UEs for NR MBS multicast service reception in an RRC inactive state.

SUMMARY

The present disclosure has been made to address at least the above problems and/or disadvantages and to provide at least the advantages described below.

Accordingly, an aspect of the present disclosure is to provide a method and apparatus for configuring user equipment for multicast reception in a wireless communication system.

Another aspect of the present disclosure is to provide systems and methods to configure the UEs to efficiently and seamlessly continue receiving one or more multicast services while the UEs transition from an RRC connected state to the RRC inactive state for MBS multicast service reception.

Another aspect of the present disclosure is to provide systems and methods to utilize one or more signaling procedures to configure the UEs for the MBS multicast service reception.

Another aspect of the present disclosure is to provide systems and methods for managing one or more multicast MRB configurations to store, restore, and release the multicast MRB configurations to receive multicast services in the RRC inactive state.

Another aspect of the present disclosure is to provide systems and methods for managing one or more multicast MRB configurations in different scenarios such as an RRC state change, cell selection, cell reselection, RRC reconfiguration, RRC Setup and RRC Resume.

In accordance with an aspect of the disclosure, a method for configuring a UE for MBS multicast service reception, includes receiving, in an RRC connected state, from a base station, an RRC reconfiguration message configuring the UE to perform a multicast MBS reception in an RRC inactive state, receiving, from the base station, an RRC release message including at least one configuration information on a multicast MRB, storing, in the RRC inactive state, the at least one configuration information on the multicast MRB; and receiving a multicast MBS session in the RRC inactive state based on the at least one stored configuration information.

In accordance with an aspect of the disclosure, a method performed by a base station for MBS in a wireless communication system includes transmitting, to a UE, an RRC reconfiguration message configuring the UE to perform a multicast MBS reception in an RRC inactive state, transmitting, to the UE, an RRC release message including at least one configuration information on a multicast MRB, and transmitting, to the UE, a multicast MBS session, wherein the at least one configuration information on the multicast MRB is stored in the RRC inactive state, and wherein the multicast MBS session associated with the RRC inactive state is based on the at least one stored configuration information.

In accordance with an aspect of the disclosure, a UE for MBS in a wireless communication system includes a transceiver, and a controller configured to receive, in an RRC connected state, from a base station, an RRC reconfiguration message configuring the UE to perform a multicast MBS reception in an RRC inactive state, receive, from the base station, an RRC release message including at least one configuration information on a multicast MRB, store, in the RRC inactive state, the at least one configuration information on the multicast MRB, and receive a multicast MBS session in the RRC inactive state based on the at least one stored configuration information.

In accordance with an aspect of the disclosure, a base station for MBS in a wireless communication system includes a transceiver, and a controller configured to transmit, to a UE, an RRC reconfiguration message configuring the UE to perform a multicast MBS reception in an RRC inactive state, transmit, to the UE, an RRC release message including at least one configuration information on a multicast MRB, and transmit, to the UE, a multicast MBS session, wherein the at least one configuration information on the multicast MRB is stored in the RRC inactive state, and wherein the multicast MBS session associated with the RRC inactive state is based on the at least one stored configuration information.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 illustrates a method for configuring the UE for the MBS multicast service reception, according to an embodiment;

FIG. 7 illustrates a method of releasing multicast configuration for an RRC inactive state when an RRC connection resume procedure is performed in a different cell, according to an embodiment;

DETAILED DESCRIPTION

Figure 1:
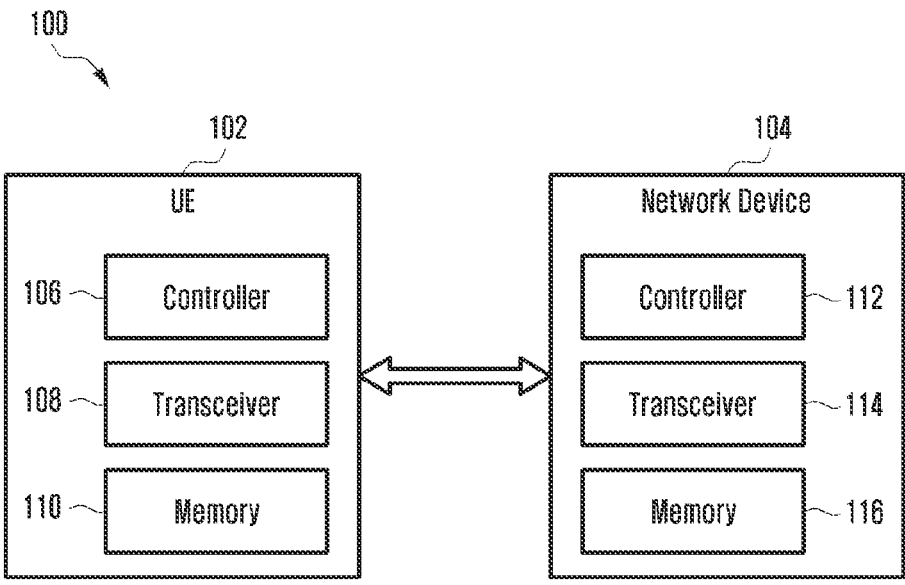
FIG. 1 illustrates a system for configuring a UE for an MBS multicast service reception in a wireless network, according to an embodiment.

Embodiments of the disclosure will be described in detail with reference to the accompanying drawings. Descriptions of well-known components and processing techniques are omitted for the sake of clarity and conciseness.

Embodiments described herein are not necessarily mutually exclusive and may be combined with one or more other embodiments to form new embodiments. The term "or" as used herein, refers to a non-exclusive or, unless otherwise indicated. The examples used herein are intended merely to facilitate an understanding of how the embodiments herein can be practiced and should not be construed as limiting the scope of the embodiments herein.

The accompanying drawings are used to assist in understanding various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms as they are merely used to distinguish one element from another.

Embodiments herein provide systems and methods for configuring UEs for NR MBS multicast service reception. Particularly, the UEs which are supporting 3GPP release 18 MBS may be capable and/or configured to receive the multicast services in the RRC_INACTIVE state, whereas the UEs pertaining to previous 3GPP release 17 MBS may not be capable and/or configured to receive the multicast services in the RRC_INACTIVE state. Co-existence of these two sets of UEs in the same cell/network is feasible and needs to be supported.

In the legacy (for example, 3GPP Rel17 MBS), when the UE receives RRC reconfiguration for deactivation that includes multicast MRB release for a temporary mobile group identity (TMGI), the UE releases the multicast MRB configuration and when the UE is transitioned to RRC_IDLE state or RRC_INACTIVE state (for example, network releases the UE due to inactivity), the UE monitors for group notification or group paging for the activation of the TMGI, and may return to RRC_CONNECTED state to receive the multicast configuration through dedicated signaling and continue the multicast session. However, the UEs which are capable or need to receive a multicast session in the RRC_INACTIVE state may be unable to receive multicast services in the RRC_INACTIVE state if the multicast configuration is already released while the UE was in the RRC_CONNECTED state and then the UE was released to the RRC_INACTIVE state. The UE may be forced to be in the RRC_CONNECTED state, which may increase network congestion and UE power consumption. To overcome these issues, the UE which is capable and/or configured to receive multicast in the RRC_INACTIVE state, does not release the multicast configuration when the RRC reconfiguration with the MRB release is received for deactivation in the RRC_CONNECTED state (for example, through RRC reconfiguration). Alternatively, the UE stores the configuration for multicast MRB which the UE needs to receive multicast in the RRC_INACTIVE state, when the RRC reconfiguration with MRB release is received for deactivation. For example, the UE may store only the applicable or relevant part of configurations from the RRC reconfiguration message which is needed in the RRC_INACTIVE state. The UE may store these configurations in an inactive access stratum (AS) context.

FIG. 1 illustrates a system 100 for configuring a UE for MBS multicast service reception in a wireless network, according to an embodiment.

Referring to FIG. 1, the system 100 includes a UE 102, and a network device 104. The UE 102 further comprises a controller 106, a transceiver 108, and a memory 110.

The controller 106 is configured to receive and manage NR MBS reception in an RRC_INACTIVE state.

Figure 2:
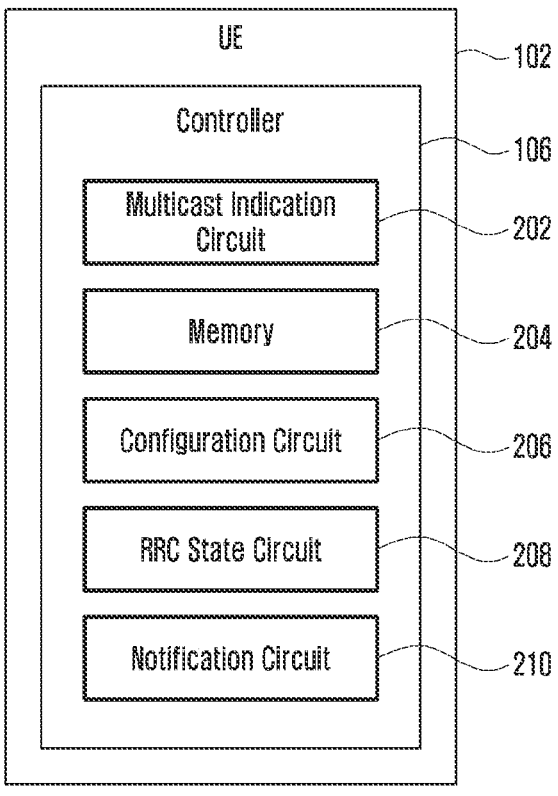
FIG. 2 illustrates an internal composition of a controller of the UE, according to an embodiment.

FIG. 2 illustrates an internal composition of the controller of the UE, according to an embodiment.

Referring to FIG. 2, the controller 106 comprises a multicast indication circuit 202, a memory 204, a configuration circuit 206, an RRC state circuit 208, and a notification circuit 210, as depicted in FIG. 2.

The multicast indication circuit 202 sends an indication to the network device 104 of at least one of capability and/or preference for MBS multicast service reception in the RRC_INACTIVE state. The network device 104 can be a radio access node such as a base station (gNB) or a core network node such as an access and mobility management function (AMF). The multicast indication circuit 202 communicates the indication in an (RRC_CONNECTED state for receiving the multicast service in the RRC_INACTIVE state. The multicast indication circuit 202 sends a signaling message to the network device 104 for indicating the capability and/or preference for the MBS multicast service reception in the RRC_INACTIVE state. For example, the signaling message can carry at least one of a bit or a field or a feature flag for supporting multicast reception in the RRC_INACTIVE state. The UE preference(s) for multicast reception in the RRC_INACTIVE state is indicated by the UE 102 to the network device 104 through the signaling message comprising, but not limited to, a UE assistance information (UAI) signaling message, an MBS interest indication (MII) signaling message, and a different RRC signaling message. The UAI or MII can be more dynamically reported when the UE preference(s) changes due to multiple parameters such as changes in interested multicast services, corresponding quality of service (QoS) requirements, UE channel conditions (for example, a better signal condition enables reliable multicast reception in the RRC_INACTIVE state while a poor signal condition enables reliable reception in the RRC_CONNECTED state), battery power, activity level, presence/absence of other unicast services or packet data unit (PDU) sessions. The UAI or MII can also carry some assistance information from the UE side that facilitates network operation in providing an appropriate configuration of the multicast service reception in the RRC_INACTIVE feature for the UE 102. Such preference or assistance information (such as mbs-InactiveAssistance may be configured as mbs-InactiveAssistanceConfig to the UE 102 via Otherconfig in an RRC reconfiguration message. The UE 102 may also be configured with a prohibit timer (for example, Txyz) to control excessive signaling of such preference(s) and/or assistance information from the UE 102 to the network device 104. The timer Txyz may be started upon transmitting the UAI carrying mbs-InactiveAssistance. The timer Txyz may be stopped upon releasing mbs-Inac-tiveAssistanceConfig during the connection re-establish-ment/resume procedures or upon receiving mbs-InactiveAs-sistanceConfig set to release.

The memory 204 receives one or more multicast MRB configurations from the network device 104 in the RRC_CONNECTED state through an RRC release with a suspend configuration message. Each multicast MRB configuration can comprise one or more configuration parameters. Each multicast MRB configuration can be a single field that indicates support for multicast MRBs in the RRC_INAC-TIVE state and/or may include a set of configuration param-eters to be utilized by the UE 102 in the RRC_INACTIVE state. Each configuration parameter corresponds to at least one of a per multicast service/MRB, a set of multicast services/MRBs, and overall multicast services/MRB s. The network device 104 indicates to the UE 102 all the configu-rations and parameters that are received in the RRC_CON-NECTED state and indicates which configuration param-eters are applicable in the RRC_INACTIVE state. Alternately, a reduced set of configuration and parameters can be provided to the UE 102 that the UE 102 needs to utilize in the RRC_INACTIVE state. The configuration parameters correspond to one or more multicast radio bearer (RB) configuration parameters, one or more medium access control (MAC) configuration parameters and one or more physical layer configuration parameters. The memory 204 receives the multicast MRB configurations based on the capability and preference for the MBS multicast service reception and receives through an RRC reconfiguration message. The memory 204 can store relevant multicast MRB configurations needed for the MBS multicast service reception in the RRC_INACTIVE state from the received multicast MRB configurations in the RRC_CONNECTED state. The memory 204 can store relevant multicast MRB configurations (mbs-InactiveAssistanceConfig) in a UE inactive AS context, upon the UE 102 transitioning to the RRC_INACTIVE state. The memory 204 receives the mul-ticast MRB configurations through an RRC release with a suspend configuration message. The memory 204 can main-tain relevant multicast MRB configurations needed for the MBS multicast service reception in the RRC_INACTIVE state from the received multicast MRB configurations in the RRC_CONNECTED state. The memory 204 can continue to receive the multicast MRB configurations in the RRC_I-NACTIVE state without suspending the multicast MRB configurations, when the UE 102 transitions from the RRC_CONNECTED state to the RRC_INACTIVE state. The multicast MRBs for which configurations are not released and/or configurations are stored and/or multicast MRBs are not suspended are explicitly configured or signaled to the UE 102 to be receivable for multicast in the RRC_INAC-TIVE state. The indicated multicast MRBs are explicitly configured or signaled to the UE 102 to be receivable for multicast services in the RRC_INACTIVE state.

The configuration circuit 206 can communicate with the memory 204 and configure the received multicast MRB configurations for receiving the multicast service in the RRC_INACTIVE state i.e., when the UE 102 switches from the RRC connected state to the RRC_INACTIVE state.

The RRC state circuit 208 can verify one or more RRC connection initiating procedures from the network device 104. The RRC state circuit 208 can verify at least one of an RRC connection resume procedure or an RRC re-establish-ment procedure, an RRC release procedure and a cell reselection procedure. The RRC state circuit 208 can deter-mine whether the RRC connection resume procedure has been initiated to a different cell than the cell where the multicast MRB configurations are configured in the RRC_I-NACTIVE state. The RRC state circuit 208 can release the configured multicast MRB configurations (mbs-InactiveAs-sistanceConfig) from the UE inactive AS context (if stored), if the RRC connection resume procedure or RRC reestab-lishment procedure has been initiated. The UE 102 may stop a timer Txyz, if the timer is set and is running. The RRC state circuit 208 can determine whether the RRC connection resume procedure has been initiated, when the multicast MRB configurations are configured in the RRC_INACTIVE state. The RRC state circuit 208 can release the multicast MRB configurations from the UE inactive AS context (if stored), if the RRC connection resume procedure has been initiated. The RRC state circuit 208 can determine whether an RRC release procedure has been initiated, when the multicast MRB configurations are configured in the RRC inactive state. The RRC state circuit 208 can release the multicast MRB configurations from the UE inactive AS context (if stored), if the RRC release procedure has been initiated. The RRC state circuit 208 can determine whether a cell reselection procedure occurs, when the multicast MRB configurations are configured in the RRC_INACTIVE state. The RRC state circuit 208 can release the configured mul-ticast MRB configurations if the cell reselection procedure has been initiated. The UE 102 may stop the timer if the timer is set and is running.

The notification circuit 210 receives one or more notifi-cations from the network device 104. The notification circuit 210 receives a notification of change of a mode of service delivery from the network device 104 to a broadcast mode of service delivery. The notification circuit 210 can release the multicast MRB configurations (mbs-multicast-Inactive-Config) (if configured), based on the received notification. The notification circuit 210 can monitor for a group notifi-cation provided by group paging and/or a multicast MBS Control Channel (MCCH) message from the network device 104 in the RRC_INACTIVE state for at least one of mul-ticast session activation, a multicast session deactivation and a multicast session release. If the group notification received by the notification circuit 210 is the multicast session activation, then the notification circuit 210 restores relevant multicast MRBs of the stored multicast MRB configura-tions, continues to receive one or more multicast MRBs/ services in the RRC_INACTIVE state, and continues to monitor for the group notification. If the group notification received by the notification circuit 210 is the multicast session activation, then the notification circuit 210 utilizes the multicast MRB configurations for the relevant MRBs received through the RRC release with a suspend configu-ration message in the RRC_CONNECTED state, continues to receive the relevant multicast MRBs/services in the RRC_INACTIVE state, and continues to monitor for the group notification. If the group notification received by the notification circuit 210 is the multicast session deactivation, then the notification circuit 210 stops receiving relevant multicast MRBs/services of the stored multicast MRB con-figurations, retains the stored multicast MRB configurations of the relevant multicast MRBs and continues monitoring for the group notification for relevant temporary mobile group identity (TMGIs). If the group notification received by the notification circuit 210 is the multicast session deactivation, the notification circuit 210 retains the multicast MRB configurations for the relevant multicast MRBs received through the RRC release with a suspend configuration message in the RRC_CONNECTED state. The notification circuit 210 further stops receiving the relevant multicast MRBs/services and continues monitoring for the group notification for relevant TMGIs. If the group notification received by the notification circuit 210 is the multicast session release, the notification circuit 210 removes relevant multicast MRBs of the stored multicast MRB configurations, removes the stored multicast MRB configurations of the relevant multicast MRBs and terminates monitoring for the group notification for relevant TMGIs. If the group notification received by the notification circuit 210 is the multicast session release, the notification circuit 210 removes the multicast MRB configurations for the relevant multicast RBs received through the RRC release with a suspend configuration message in the RRC_CONNECTED state, removes the relevant multicast MRBs, and terminates monitoring for the group notification for relevant TMGIs.

The network device 104 further comprises a controller 112, a transceiver 114, and a memory 116, as depicted in FIG. 1. The controller 112 sends multicast MRB configurations and indicate RRC initiating procedures and multicast initiating sessions to at least one UE 102.

Figure 3:
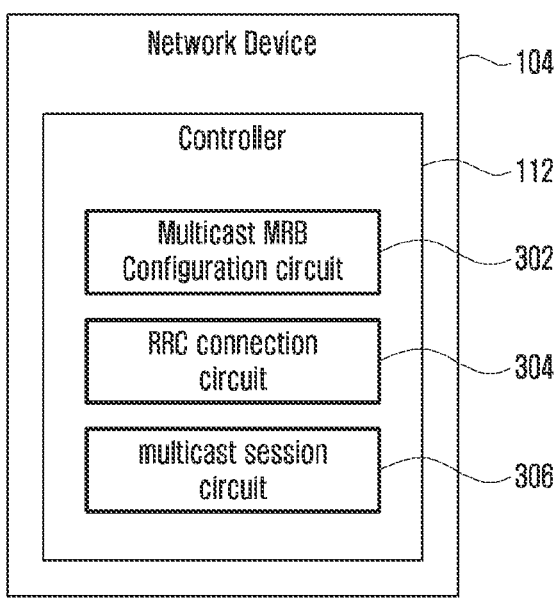
FIG. 3 illustrates an internal composition of a controller of a network device, according to an embodiment.

FIG. 3 illustrates an internal composition of a controller of a network device, according to an embodiment.

Referring to FIG. 3, the controller 112 comprises a multicast MRB configuration circuit 302, an RRC connection circuit 304, and a multicast session circuit 306.

The multicast MRB configuration circuit 302 receives an indication from the multicast indication circuit 202 of the UE 102 of a capability and/or preference for MBS multicast service reception in the RRC_INACTIVE state. The multicast MRB configuration circuit 302 sends the multicast MRB configurations to the memory 204 of the UE 102 in the RRC_CONNECTED state based on the indication of capability and/or preference for the MBS multicast service reception in the RRC_INACTIVE state.

The RRC connection circuit 304 initiates one or more RRC procedures with the UE 102, based on which the UE 102 releases the stored and/or configured multicast MRB configuration. The RRC procedures are not limited to an RRC connection resume procedure and a cell reselection procedure.

The multicast session circuit 306 sends notifications on multiple sessions such as a change of a mode of service delivery interested multicast session, a multicast session activation, a multicast session deactivation, and a multicast session release. The multicast session circuit 306 can notify the notification circuit 210 of the UE 102, a change of a mode of service delivery interested multicast session to a broadcast mode of service delivery interested multicast session. Based on the notification, the notification circuit 210 of the UE 102 may release the mbs-multicast-Inactive-Config (if configured). On such a change of service delivery, the network device 104 may experience more UEs using the multicast session in the service coverage area. The multicast session circuit 306 sends a group notification to the notification circuit 210 of the UE 102 (for example, notification can be provided by group paging and/or multicast MBS control channel (MCCH) message) indicating at least one of a multicast session activation, a multicast session deactivation and a multicast session release, when the UE 102 is in the RRC_INACTIVE state. Based on the received group notification, the notification circuit 210 of the UE 102 may restore or remove the multicast MRB configurations.

The controller 106 and the controller 112 can process and execute data of an internal composition of the UE 102 and the network device 104. The controller 106 and the controller 112 can be configured to execute instructions stored in the memory 110 and the memory 116. The controller 106 and the controller 112 may comprise one or more of microprocessors, circuits, and other hardware configured for processing. The controller 106 and the controller 112 can be at least one of a single processer, a plurality of processors, multiple homogeneous or heterogeneous cores, multiple central processing units (CPUs) of different types, microcontrollers, special media, and other accelerators. The controller 106 and the controller 112 may be an application processor (AP), a graphics-only processing unit such as a graphics processing unit (GPU), a visual processing unit (VPU), and/or an AI-dedicated processor such as a neural processing unit (NPU).

The plurality of circuits of the controller 106 of the UE 102 can communicate with the network device 104 via the transceiver 108. The plurality of circuits of the controller 112 of the network device 104 can communicate with the UE 102 via the transceiver 114. The communication circuits 108 and 114 may be in the form of either a wired network or a wireless communication network circuit. The wireless communication network may comprise, but not limited to, global positioning system (GPS), global system for mobile communications (GSM), wireless fidelity (Wi-Fi), Bluetooth™ low energy, and near-field communication (NFC). The wireless communication may further comprise one or more of Bluetooth™, ZigBee™, a short-range wireless communication such as ultra-wideband (UWB), and a medium-range wireless communication such as Wi-Fi or a long-range wireless communication such as 3G/4G/5G/6G and non-3GPP technologies or WiMAX, according to the usage environment.

The UE 102 and the network device 104 may include a fewer or greater number of circuits than those illustrated in FIGS. 1-3. The labels or names of the circuits are used only for illustrative purposes and do not limit the scope of the invention. One or more circuits can be combined together to perform the same or substantially similar function in the UE 102 and the network device 104.

Upon transitioning to the RRC_INACTIVE state, the UE 102 can store mbs-InactiveAssistanceConfig in the UE Inactive AS context.

Upon initiation of RRC reestablishment procedure, the UE 102 may release mbs-InactiveAssistanceConfig if configured. The UE 102 may stop timer Txyz, if it is running.

Upon cell reselection, the UE 102 releases mbs-InactiveAssistanceConfig, if configured. The UE 102 may stop timer Txyz, if it is running.

The UE 102 may be pre-configured or configured for the multicast reception in the RRC_INACTIVE through a dedicated signaling message, such as an RRC reconfiguration message along with multicast MRB(s) configuration.

FIG. 4 illustrates a method 400 for configuring the UE 102 for the MBS multicast service reception, according to an embodiment.

Referring to FIG. 4, in step 402, the network device 104 receives an indication from the UE 102 of capability and/or preference for the MBS multicast service reception in the RRC_INACTIVE state. The indication has been received in the RRC_CONNECTED state.

In step 404, the network device 104 sends one or more multicast MRB configurations to the UE 102 in the RRC_CONNECTED state, after receiving the indication of the capability and/or preference for the MBS multicast service reception in the RRC_INACTIVE state.

In step 406, the UE 102 receives the multicast MRB configurations through an RRC release with a suspend configuration message.

In step 408, the UE 102 stores relevant multicast MRB configurations used for the MBS multicast service reception in the RRC_INACTIVE state, in the UE inactive AS context from the received multicast MRB configurations in the RRC connected state.

In step 410, the UE 102 continues to receive the multicast MRB configurations in the RRC_INACTIVE state without suspending the multicast MRB configurations, when the UE 102 transitions from the RRC connected state to the RRC_I-NACTIVE state.

In step 412, the UE 102 configures the received multicast MRB configurations for the MBS multicast service reception in the RRC_INACTIVE state.

The various actions in method 400 may be performed in the order presented, in a different order or simultaneously. Further, in some embodiments, some actions listed in FIG. 4 may be omitted.

Figure 5:
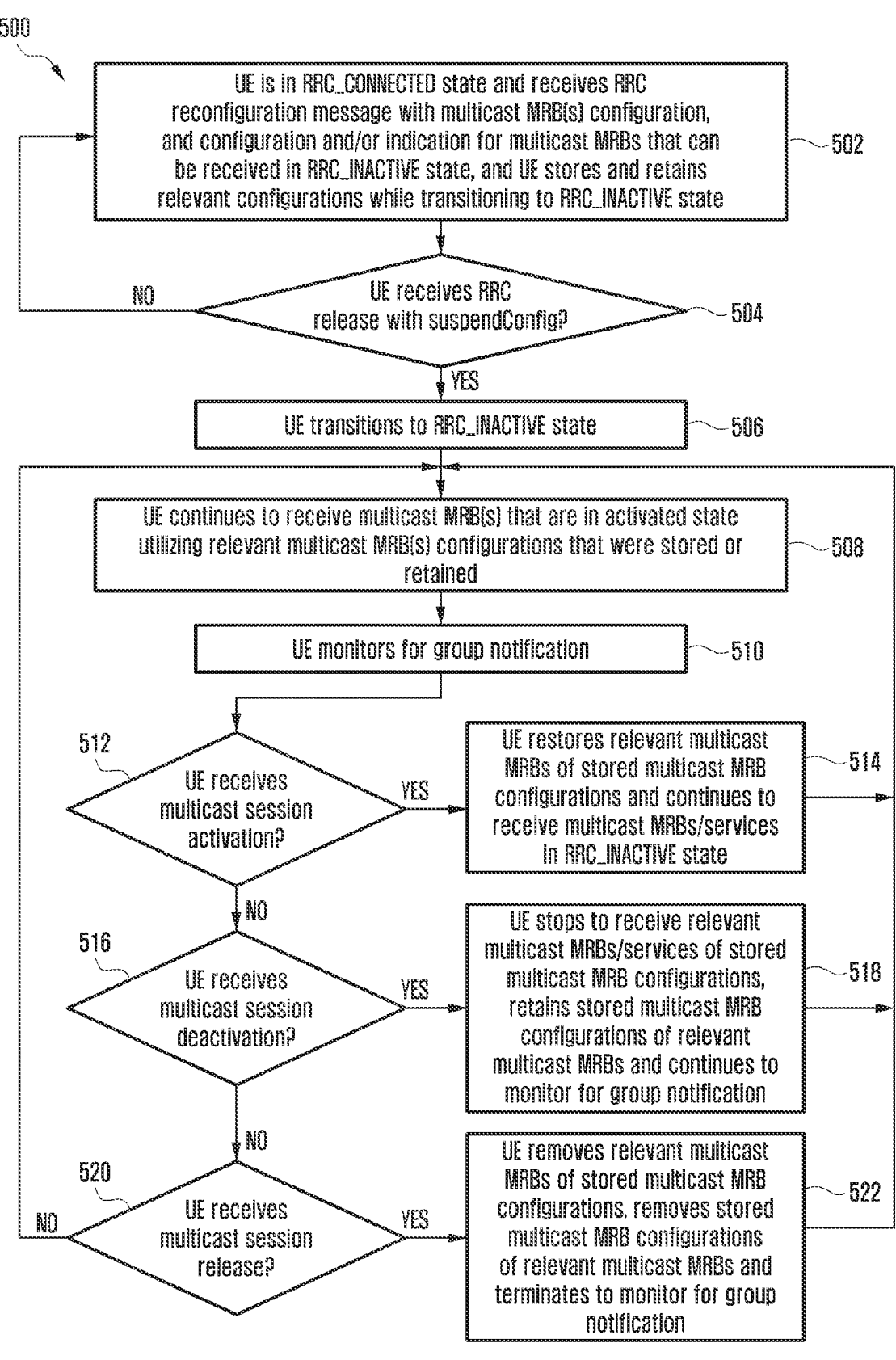
FIG. 5 illustrates a method of configuring the UE with an RRC reconfiguration message for receiving multicast session in an RRC inactive state, according to an embodiment.

FIG. 5 illustrates a method 500 of configuring a UE 102 with an RRC reconfiguration message for receiving multicast session in the RRC_INACTIVE state, according to an embodiment.

Referring to FIG. 5, the UE 102 may be pre-configured or configured for the MBS multicast service reception in the RRC_INACTIVE state through a dedicated signaling message, e.g., an RRC reconfiguration message along with one or more multicast MRB configurations.

In step 502, when the UE 102 is in the RRC_CON-NECTED state, the UE 102 receives the RRC reconfiguration message with the multicast MRB configurations. The RRC reconfiguration message also provides configuration and/or indication for one or more multicast MRBs that can be received in the RRC_INACTIVE state. The UE 102 stores and retains these relevant configurations while transitioning to the RRC_INACTIVE state from the RRC_CO-NNECTED state.

In step 504, the UE 102 determines whether the RRC release message has been received from the network device 104. If the UE 102 has received the RRC release message, then the UE 102 transitions to the RRC_INACTIVE state, in step 506.

If the UE 102 has not received the RRC release message, then the method returns to step 502. In step 508, the UE 102 continues to receive the multicast MRB configurations that are in activated state utilizing relevant multicast MRBs that were stored or retained.

In step 510, the UE 102 monitors for a group notification (for example, group paging or MCCH message) from the network device 104 in the RRC_INACTIVE state for at least one of a multicast session activation, a multicast session deactivation and a multicast session release. In step 512, the UE 102 determines whether the UE 102 has received the group notification (for example, group paging) notifying activation of multicast MRBs through the multicast session activation. If the group notification is the multicast session activation, then in step 514, the UE 102 restores relevant multicast MRBs of the stored multicast MRB configurations and continues to receive the multicast MRBs/services in the RRC_INACTIVE state. The UE 102 continues monitoring for the group notification (for example, for possible session deactivation).

If the UE 102 has not received the group notification as the multicast session activation, then in step 516, the UE 102 determines whether the UE 102 has received the group notification (for example, MCCH message) notifying deactivation of multicast MRBs through the multicast session deactivation. If the group notification is the multicast session deactivation, then in step 518, the UE 102 stops receiving the relevant multicast MRBs/services of the stored multicast MRB configurations, retains the stored MRB configurations of the relevant multicast MRBs and continues monitoring for the group notification (for example, for possible session activation).

If the UE 102 has not received the group notification as the multicast session deactivation, then in step 520, the UE 102 determines whether the UE 102 has received the group notification (for example, MCCH message) notifying release of multicast MRBs through the multicast session release. If the group notification is the multicast release, then in step 522, the UE 102 removes the relevant multicast MRBs of the stored multicast MRB configurations, removes the stored multicast MRB configurations of the relevant multicast MRBs and terminates monitoring for the group notification. If the UE 102 has not received the group notification as the multicast session release, then the method returns to step 508 and the UE 102 continues to receive the multicast MRB(s) that are in activated state.

The various actions in method 500 may be performed in the order presented, in a different order or simultaneously. In some embodiments, some actions listed in FIG. 5 may be omitted.

The UE 102 may store only the applicable or relevant part of the RRC reconfiguration which is needed in the RRC_I-NACTIVE state. For example, a point-to-multipoint (PTM) discontinuous reception (DRX) configuration for the multicast MRBs received in the RRC reconfiguration message can be preserved partially or fully that can be utilized in the RRC_INACTIVE state. These configurations may include multicast MBS radio bearers (MRBs) configuration, and also MAC-CellGroupConfig configuration and Physical-CellGroupConfig configurations, but excluding all the point-to-point (PTP) configurations, hybrid automatic repeat request (HARQ) configuration (for example, HARQ feedback mode, HARQ feedback enable), HARQ retransmission (for example, DRX round trip time (RTT) timer, DRX retransmission timer), channel state information (CSI) configuration, sounding reference signals (SRS) configurations, unicast bandwidth part (BWP) configurations (for example, only MBS crest factor reduction (CFR) configuration is relevant), and timing advance (TA) timer configuration. In a multicast MRB configured with one PTP radio link control (RLC) entity and one PTM RLC entity, the PTP RLC may be released at RRC release (for example, transition to RRC_INACTIVE), whereas the PTM RLC may be maintained. In a multicast MRB configured with only one PTP RLC, the multicast MRB is maintained at RRC release (for example, transition to the RRC_INACTIVE state) with switching from PTP RLC to PTM RLC.

Figure 6:
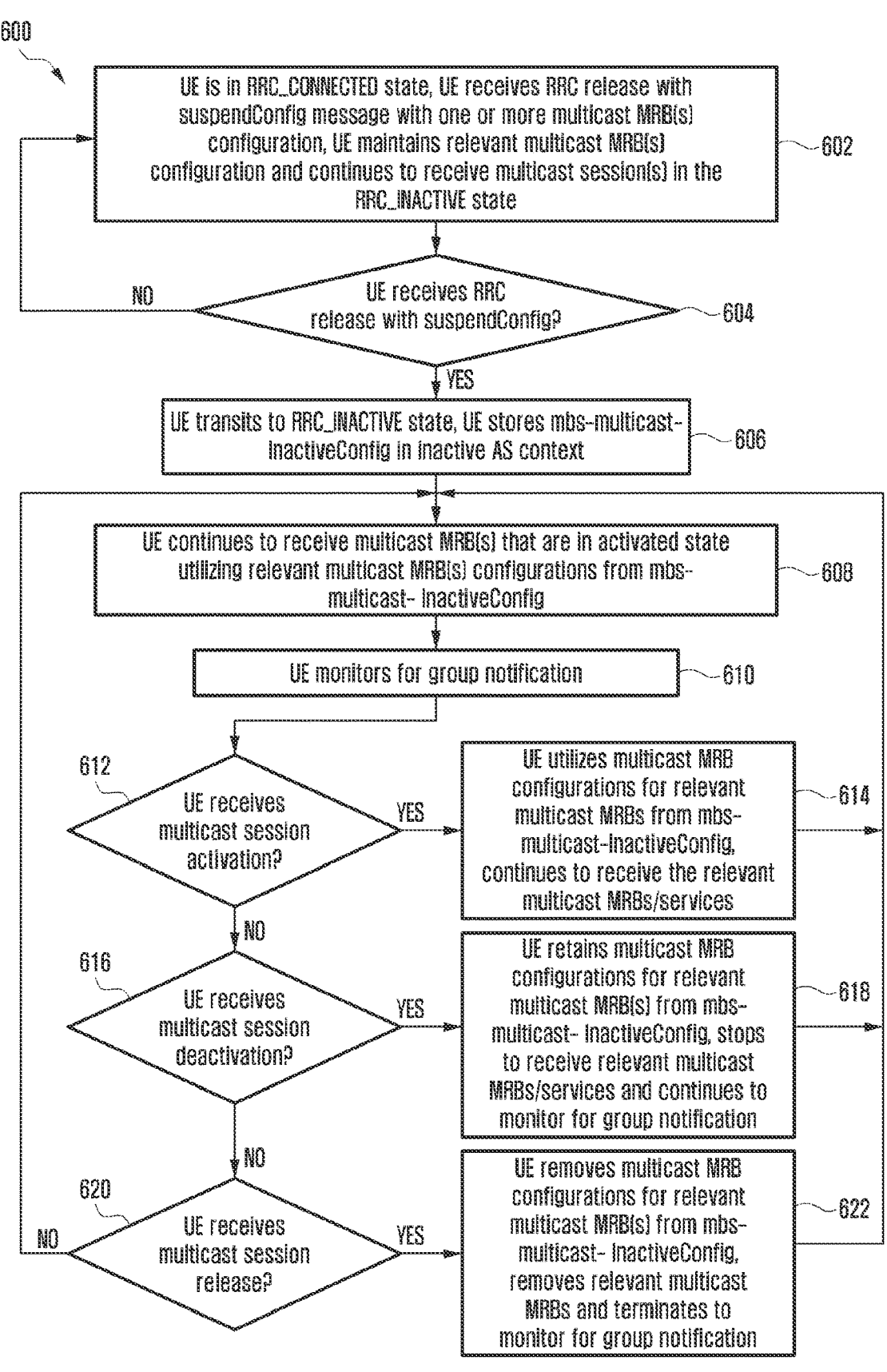
FIG. 6 illustrates a method of configuring the UE with an RRC Release with a suspendConfig message for receiving multicast session in the RRC inactive state, according to an embodiment.

FIG. 6 illustrates a method 600 of configuring the UE 102 with an RRC Release with a suspendConfig message for receiving multicast session in the RRC_INACTIVE state, according to an embodiment.

Referring to FIG. 6, the UE 102 is capable and/or configured to receive the multicast service in the RRC_INAC-TIVE state.

In step 602, when the UE 102 has an activated session in the RRC_CONNECTED state released to the RRC_INAC-TIVE state by the network device 104 by the RRC Release with a suspendConfig message, the UE 102 maintains relevant multicast MRB(s) configuration (for example, at least the set of parameters that are needed to receive multicast in the RRC_INACTIVE) and continues to receive relevant multicast session(s) in the RRC_INACTIVE state. Thus, the UE 102 does not suspend the relevant multicast MRB(s), when the UE 102 transitions to the RRC_INACTIVE state. This is unlike in the legacy system which is incapable of and/or not configured to receive multicast in the RRC_I-NACTIVE. The RRC message indicates multicast MRBs which have not been suspended and those which are suspended, when the UE 102 transitions to the RRC_INAC-TIVE state.

The multicast MRBs for which configurations are not released and/or configurations are stored and/or multicast MRBs are not suspended are explicitly configured or signaled to the UE 102 to be receivable for multicast in the RRC_INACTIVE.

In step 604, the UE 102 determines whether the RRC release with a suspendConfig message including mbs-multicast-InactiveConfig has been received from the network device 104 for receiving multicast/MRBs in the RRC_I-NACTIVE state. If the UE 102 has received the RRC release with a suspendConfig message, then the UE 102 transitions to the RRC_INACTIVE state, In step 606. The UE 102 may store mbs-multicast-InactiveConfig in inactive AS context. If the UE 102 has not received the RRC release message, then the method returns to step 602. In step 608, the UE 102 continues to receive the multicast MRB configurations that are in activated state utilizing relevant multicast MRBs from mbs-multicast-InactiveConfig.

In step 610, the UE 102 monitors for a group notification (for example, group paging and/or MCCH message) from the network device 104 in the RRC_INACTIVE state for at least one of a multicast session activation, a multicast session deactivation and a multicast session release. In step 612, the UE 102 determines whether the UE 102 has received the group notification (for example, group paging) notifying activation of multicast MRBs through the multicast session activation. If the group notification is the multicast session activation, then in step 614, the UE 102 utilizes the multicast MRB configurations for relevant multicast MRBs received from mbs-multicast-InactiveConfig through the RRC release with a suspend configuration message in the RRC_CONNECTED state and continues to receive the relevant multicast MRBs/services in the RRC_I-NACTIVE state. The UE continues monitoring for the group notification (for example, for possible session deactivation).

In step 616, if the UE 102 has not received the group notification as the multicast session activation, the UE 102 determines whether the UE 102 has received the group notification (for example, MCCH message) notifying deactivation of multicast MRBs through the multicast session deactivation. If the group notification is the multicast session deactivation, then in step 618, the UE 102 retains the multicast MRB configurations for the relevant multicast MRBs received from mbs-multicast-InactiveConfig through the RRC release with a suspend configuration message in the RRC_CONNECTED state, stops receiving the relevant multicast MRBs/services and continues monitoring for the group notification.

If the UE 102 has not received the group notification as the multicast session deactivation, then in step 620, the UE 102 determines whether the UE 102 has received the group notification (for example, MCCH message) notifying release of multicast MRBs through the multicast session release. If the group notification is the multicast release, then in step 622, the UE 102 removes the multicast MRB configurations for the relevant multicast MRBs received from mbs-multicast-InactiveConfig through the RRC release with a suspend configuration message in the RRC_CONNECTED state, removes relevant multicast MRBs and terminates monitoring for the group notification. If the UE 102 has not received the group notification as the multicast session release, then the method returns to step 608 and the UE 102 continues to receive the multicast MRB(s) that are in activated state.

The various actions in method 600 may be performed in the order presented, in a different order or simultaneously. Further, in some embodiments, some actions listed in FIG. 6 may be omitted.

An example specification is provided for "Multicast MRB Release" procedure with consideration for the UE 102 that are capable or configured to receive multicast in the RRC_I-NACTIVE state as follows:

5.3.5.6.6 Multicast MRB Release

The UE 102 shall:

1> for each MRB-Identity value included in the MRB-ToReleaseList that is part of the current UE configuration; or 1> for each MRB-Identity value that is to be released as the result of full configuration according to 5.3.5.11:

2> if MRB-identity is configured to be receivable in the RRC_INACTIVE, the UE 102 stores (relevant) configuration of multicast MRB;

2> release the PDCP entity and the MRB-Identity;

2> if there is no other multicast MRB configured with the same TMGI as configured for the released multicast MRB:

3> indicate the release of the user plane resources for the TMGI to upper layers.

NOTE 1: The UE 102 does not consider the message as erroneous if the MRB-ToReleaseList includes any MRB-Identity value that is not part of the current UE configuration.

NOTE 2: Whether the RLC and MAC entities associated with this PDCP entity are reset or released is determined by the CellGroupConfig.

The RRC Release with a suspendConfig provides the configuration for the multicast MRB(s) (mbs-multicast-InactiveConfig) that is to be used for multicast reception in the RRC_INACTIVE state. The UE 102 may store mbs-multicast-InactiveConfig in the Inactive As context. An example of specification for the suspendConfig is as follows:

```
suspendConfig ::=                      SEQUENCE {
    fulll-RNTI                             I-RNTI-Value,
    shortI-RNTI                            ShortI-RNTI-Value,
    ran-PagingCycle                        PagingCycle,
    ran-NotificationAreaInfo                         RAN-NotificationAreaInfo
    OPTIONAL,            -- Need M
    t380                                             PeriodicRNAU-TimerValue
    OPTIONAL,            -- Need R
    nextHopChainingCount                   NextHopChainingCount,
    ...,
    [[
    sl-ServingCellInfo-r17                            SL-ServingCellInfo-r17
```

-continued

```
OPTIONAL, -- Cond L2RemoteUE
  sdt-Config-r17                          SetupRelease { SDT-Config-r17 }
OPTIONAL,            -- Need M
  srs-PosRRC-InactiveConfig-r17 SRS-PosRRC-InactiveConfig-r17
OPTIONAL,            -- Need M
  ran-ExtendedPagingCycle-r17                       ExtendedPagingCycle-r17
OPTIONAL          -- Need R
  mbs-multicast-InactiveConfig-r18      MBS-multicast-InactiveConfig-r18
  ]]
}
mbs-multicast-InactiveConfig-r18 ::=              SEQUENCE {
mbs-InactiveConfig-r18                        MBS-InactiveConfig-r18,
mbs-InactiveMacConfig-r18                 MBS-InactiveMacConfig-r18
mbs-InactivePhyConfig-r18                  MBS-InactivePhyConfig-r18
}
MBS-InactiveConfig-r18 ::=             SEQUENCE{
  mrb-ToAddModList                             MRB-ToAddModList
OPTIONAL,
  mrb-ToReleaseList                             MRB-ToReleaseList
OPTIONAL
}
MBS-InactiveMacConfig-r18 ::=            SEQUENCE{
  g-RNTI-ConfigToAddModList        SEQUENCE (SIZE (1..maxG-RNTI)) OF
  MBS-RNTI-SpecificConfig             OPTIONAL,
  g-RNTI-ConfigToReleaseList         SEQUENCE (SIZE (1..maxG-RNTI)) OF
  MBS-RNTI-SpecificConfigId          OPTIONAL,
  g-CS-RNTI-ConfigToAddModList       SEQUENCE (SIZE (1..maxG-CS-RNTI))
  OF MBS-RNTI-SpecificConfig          OPTIONAL,
  g-CS-RNTI-ConfigToReleaseList      SEQUENCE (SIZE (1..maxG-CS-RNTI)) OF
  MBS-RNTI-SpecificConfigId   OPTIONAL,
  ]]
}
MBS-RNTI-SpecificConfig ::=                   SEQUENCE {
  mbs-RNTI-SpecificConfigI          MBS-RNTI-SpecificConfigId,
  groupCommon-RNTI                  CHOICE {
    g-RNTI                          RNTI-Value,
      g-CS-RNTI                         RNTI-Value
},
drx-ConfigPTM                           SetupRelease { DRX-ConfigPTM }
OPTIONAL,           -- Need M
  pdsch-AggregationFactorMulticast ENUMERATED {n2, n4, n8}
OPTIONAL             -- Cond G-RNTI
}
MBS-RNTI-SpecificConfigId ::= INTEGER (0..maxG-RNTI-1)
}
MBS-InactivePhyConfig-r18 ::=             SEQUENCE{
Pdcch-config                             SetupRelease {PDCCH-Config}
OPTIONAL,           -- Need M
Pdsch-config                             SetupRelease {PDCCH-Config}
OPTIONAL,           -- Need M
}
```

MBS-multicast-InactiveConfig field description:

The MBS-InactiveMacConfig-r18 can be used to config-ure MBS radio bearers for multicast reception in the RRC_I-NACTIVE state.

The MBS-InactiveMacConfig-r18 can be used to config-ure MAC parameters, including DRX, for multicast recep-tion in the RRC_INACTIVE state.

The MBS-InactivePhyConfig-r18 can be used to config-ure cell-group specific L1 parameters for multicast in the RRC_INACTIVE state.

The aforementioned radio bearer configuration param-eters, MAC configuration parameters and physical layer configuration parameters can also be structured or grouped in accordance to the PTM configuration of the MBS broad-cast PTM configurations.

A combination of approaches i.e., both storing relevant configurations from the RRC reconfiguration message for multicast MRBs to receive multicast in the RRC_INAC-TIVE state (for example, configurations of multicast MRBs which are in activated state in the RRC_CONNECTED) and providing relevant configurations for multicast MRB(s) with RRC release with a suspendConfig message to receive multicast in the RRC_INACTIVE state (for example, con-figurations of multicast MRBs which are in deactivated state in the RRC_CONNECTED) may be utilized.

FIG. 7 illustrates a method 700 of releasing multicast configuration for an RRC_INACTIVE state when an RRC connection resume procedure is performed in a different cell than the cell providing the configuration, according to an embodiment.

Referring to FIG. 7, in step 702, the UE 102 receives an RRC release message with a suspendConfig including mbs-multicast-InactiveConfig for receiving multicast MRBs in the RRC_INACTIVE state. In step 704, the UE 102 transi-tions to the RRC_INACTIVE state from the RRC_CON-NECTED state.

In step 706, the UE 102 determines whether an RRC connection resume procedure has been initiated, by the network device 104, to a different cell than the cell where the multicast MRB configurations are configured in the RRC inactive state. If the RRC connection resume procedure has been initiated, the UE 102 releases multicast MRB configurations mbs-multicast-InactiveConfig (if configured) in step 708. If the RRC connection resume procedure has not been initiated, then step 706 continues to be performed.

The various actions in method 700 may be performed in the order presented, in a different order or simultaneously. In some embodiments, some actions listed in FIG. 7 may be omitted.

Upon initiation of the RRC connection resume procedure, the UE 102 shall:

1> if the UE 102 performs connection resumption in a different cell than the cell where mbs-multicast-InactiveConfig was configured; and 2> release mbs-multicast-InactiveConfig, if configured.

Figure 8:
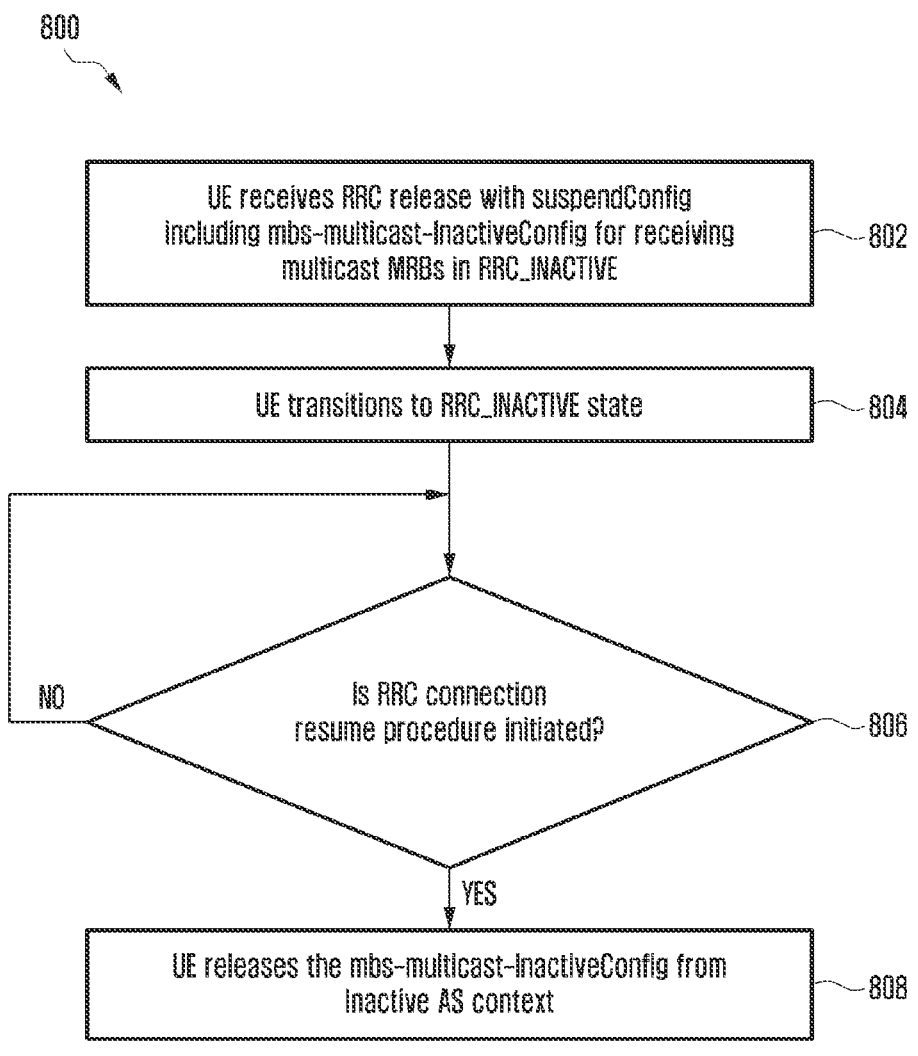
FIG. 8 illustrates a method of releasing multicast configuration for an RRC inactive state when an RRC connection resume procedure has been initiated, according to an embodiment.

FIG. 8 illustrates a method 800 of releasing multicast configuration for an RRC_INACTIVE state from Inactive AS context when an RRC connection resume procedure has been initiated, according to an embodiment.

Referring to FIG. 8, in step 802, the UE 102 receives an RRC Release with a suspendConfig including mbs-multicast-InactiveConfig for receiving multicast MRBs in the RRC_INACTIVE state. The UE 102 transitions to the RRC_INACTIVE state from the RRC_CONNECTED state In step 804.

In step 806, the UE 102 determines whether an RRC connection resume procedure has been initiated, by the network device 104, when the multicast MRB configurations are configured in the RRC_INACTIVE state. If the RRC connection resume procedure has been initiated, then the UE 102 releases multicast MRB configurations mbs-multicast-InactiveConfig from the UE inactive AS context (if stored) in step 808. The UE 102 stops the timer Txyz, if it is running. If the RRC connection resume procedure is not initiated, then step 806 continues to be performed.

The various actions in method 800 may be performed in the order presented, in a different order or simultaneously. In some embodiments, some actions listed in FIG. 8 may be omitted.

In an example, upon initiation of the RRC connection resume procedure, the UE 102 shall:

1> release mbs-InactiveAssistanceConfig from the UE Inactive AS context, if stored; and 2> stop timer Txyz, if running.

Figure 9:
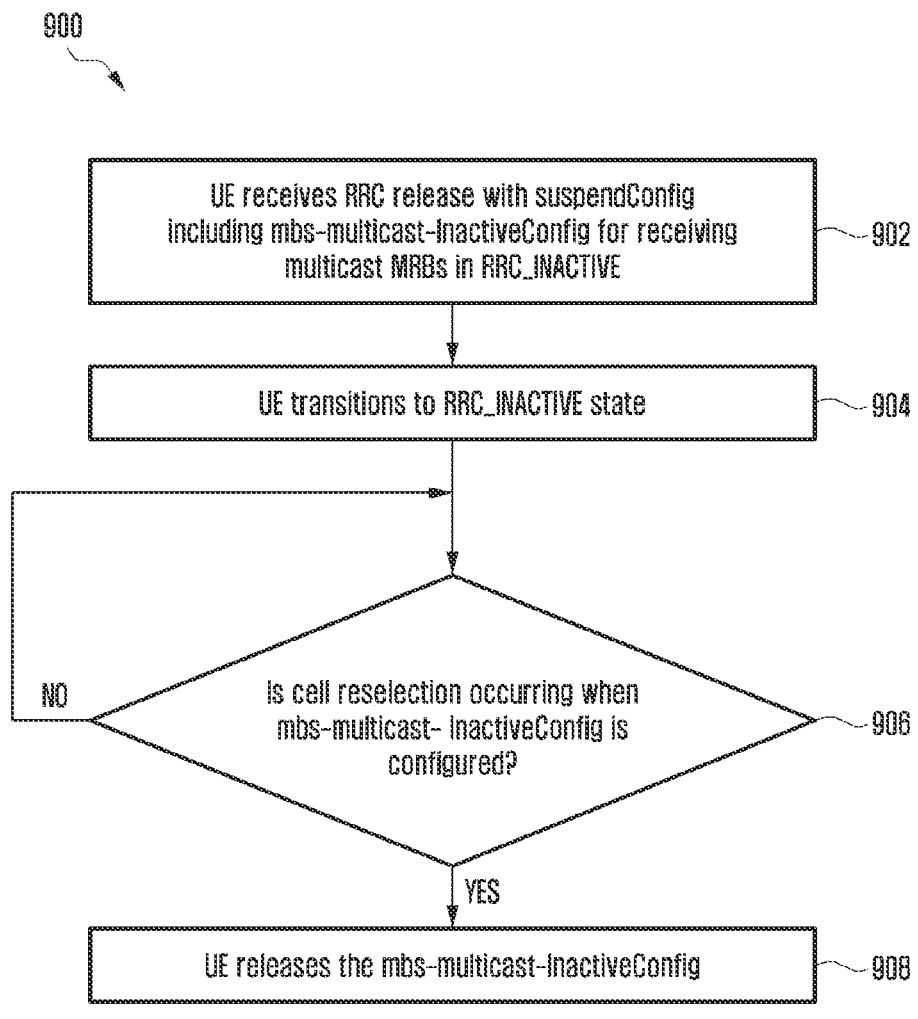
FIG. 9 illustrates a method of releasing multicast configuration for an RRC inactive state when cell reselection is performed, according to an embodiment.

FIG. 9 illustrates a method 900 of releasing multicast configuration for an RRC_INACTIVE state when cell reselection is performed, according to an embodiment.

Referring to FIG. 9, in step 902, the UE 102 receives an RRC Release with a suspendConfig including mbs-multicast-InactiveConfig for receiving multicast MRBs in the RRC_INACTIVE state. The UE 102 transitions to the RRC_INACTIVE state from the RRC_CONNECTED state in step 904.

In step 906, the UE 102 determines whether a cell reselection procedure is occurring, when the multicast MRB configurations are configured in the RRC inactive. If the RRC cell reselection procedure has been initiated, then the UE 102 releases multicast MRB configurations mbs-multicast-InactiveConfig (if configured) in step 908. If the cell reselection procedure is not initiated, then step 906 continues to be performed.

The various actions in method 900 may be performed in the order presented, in a different order or simultaneously. In some embodiments, some actions listed in FIG. 9 may be omitted.

In an example, upon initiation of the cell reselection procedure, the UE 102 shall:

1> if cell reselection occurs when mbs-multicast-InactiveConfig is configured:

2> release the mbs-multicast-InactiveConfig.

Figure 10:
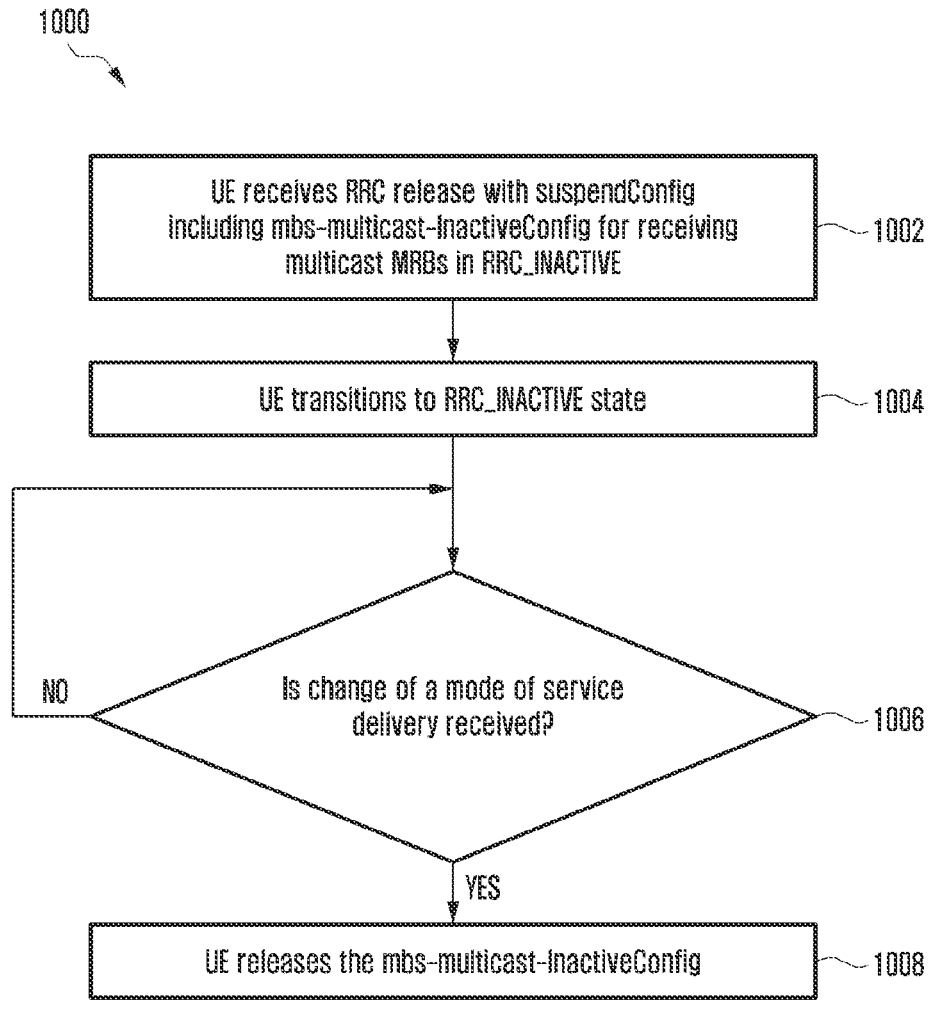
FIG. 10 illustrates a method of releasing multicast configuration for an RRC inactive state when change of a mode of service delivery is performed, according to an embodiment.

FIG. 10 illustrates a method 1000 of releasing multicast configuration for an RRC_INACTIVE state when change of a mode of service delivery is performed, according to an embodiment.

Referring to FIG. 10, in step 1002, the UE 102 receives an RRC Release with a suspendConfig including mbs-multicast-InactiveConfig for receiving multicast MRBs in the RRC_INACTIVE state, in step 1002. The UE 102 transitions to the RRC_INACTIVE state from the RRC_ CONNECTED state in step 1004.

In step 1006, the UE 102 determines whether a notification of change of a mode of service delivery (of interested multicast session), from the network device 104, to a broadcast mode of service delivery has been received. If the change of a mode of service delivery has been initiated, then the UE 102 releases multicast MRB configurations mbs-multicast-InactiveConfig (if configured) in step 1008. On such a change of service delivery occurring, the network may experience a large number of UEs using the multicast session in the service coverage area. If the change of a mode of service delivery is not initiated, then step 1006 continues to be performed.

The various actions in method 1000 may be performed in the order presented, in a different order or simultaneously. In some embodiments, some actions listed in FIG. 10 may be omitted.

The UE 102 may be informed or configured by the network device 104 about the coverage area of the multicast session (for example, cells or cell-list providing the multicast session in the RRC_INACTIVE state and the UE 102 can continue to retain and/or use the mbs-multicast-InactiveConfig across these cells, such as when there is cell reselection occurring). If the UE 102 is performing cell reselection to a different cell (for example, outside coverage area or different than an informed cell list), the UE 102 releases the mbs-multicast-InactiveConfig, (if configured).

When the UE 102 that is capable and/or configured to receive multicast in the RRC_INACTIVE, receives an RRC-Setup in response to an RRCReestablishmentRequest or receives RRCSetup in response to an RRCResumeRequest or RRCResumeRequest1, the UE 102 releases the radio resources for established radio bearer except signaling radio bearer 0 (SRB0) including release of the RLC entities of the associated PDCP entities and of service data adaption protocol (SDAP), except for multicast MRBs for MBS multicast services configured to be received in the RRC_INACTIVE state. The UE 102 releases the RRC configuration except for the default L1 parameter values, default MAC cell group configuration and common control channel (CCCH) configuration and except for RRC configuration for multicast MRBs for MBS multicast services configured to be received in the RRC_INACTIVE state. The UE 102 performs the radio bearer configuration procedure including multicast MRBs addition/modification or release in accordance with the received radioBearerConfig in the RRCSetup. The UE 102 can therefore consider the existing multicast MRBs configuration, MRB-identity and TMGI while configuring multicast MRBs from the RRCSetup. That is, if there is a change of MRB-identity for same TMGI in these two configurations, it can be resolved. An example specification for the above scenario is as follows:

5.x.y.z Reception of the RRCSetup by the UE

The UE shall perform the following actions on reception of the RRCSetup:

1> if the RRCSetup has been received in response to an RRCReestablishmentRequest; or 1> if the RRCSetup has been received in response to an RRCResumeRequest or RRCResumeRequest1:

2> discard any stored UE Inactive AS context and suspendConfig;

2> discard any current AS security context including the KRRCenc key, the KRRCint key, the KUPint key and the KUPenc key;

2> release radio resources for all established RBs except SRB0, including release of the RLC entities, of the associated PDCP entities and of SDAP, except for multicast MRBs which are configured or receivable in the RRC_INACTIVE state;

2> release the RRC configuration except for the default L1 parameter values, default MAC Cell Group configuration and CCCH configuration, and except for the RRC configuration for multicast MRBs which are configured or receivable in the RRC_INACTIVE;

2> indicate to upper layers fallback of the RRC connection;

2> discard any application layer measurement reports which were not transmitted yet;

2> inform upper layers about the release of all application layer measurement configurations;

2> stop timer T380, if running;

1> perform the cell group configuration procedure in accordance with the received masterCellGroup and as specified in 5.3.5.5;

1> perform the radio bearer configuration procedure in accordance with the received radioBearerConfig and as specified in 5.3.5.6;

1> if stored, discard the cell reselection priority information provided by the cellReselectionPriorities or inherited from another RAT;

The multicast MRBs, for which radio resources and RRC (re-)configuration have not been released, are explicitly configured or signaled to the UE 102 to be receivable in the RRC_INACTIVE state.

If the RRCRelease message with a suspendConfig has been received, which is not in response to an RRCResumeRequest or an RRCResumeRequest1, the UE 102 stores in the UE Inactive AS Context, G-radio network temporary identifier (RNTI)(s)/G-CS-RNTI(s) or TMGI(s) for MBS services used in the source primary cell (PCell).

If the RRCRelease message with a suspendConfig includes mbs-multicast-InactiveConfig, the UE 102 stores in the UE Inactive AS Context, G-RNTI(s)/G-CS-RNTI(s) or TMGI(s) for MBS multicast services that are configured to receive multicast in the RRC_INACTIVE as provided in mbs-multicast-InactiveConfig.

If the RRCRelease message with a suspendConfig includes mbs-multicast-InactiveConfig, the UE 102 suspends all SRB(s) and DRB(s) and multicast MRB(s), except SRB0 and multicast MRB(s) that are configured to receive multicast in the RRC_INACTIVE state as provided in mbs-multicast-InactiveConfig. The UE 102 indicates PDCP suspend to lower layers of all DRBs and multicast MRBs, except multicast MRB(s) that are configured to receive multicast in the RRC_INACTIVE state.

If the RRCRelease message with a suspendConfig includes mbs-multicast-InactiveConfig, on the UE 102 entering RRC_INACTIVE state, the UE 102 performs cell selection such that the UE 102 can camp on or select the same current cell providing multicast services. For this purpose, the UE 102 can prioritize the current cell. Alternatively, the UE 102 skips the cell selection step and selects the same current cell for camping and continuing multicast services.

An example of the foregoing is as follows:

1> if the RRCRelease includes suspendConfig:

2> reset MAC and release the default MAC Cell Group configuration, if any;

2> apply the received suspendConfig except the received nextHopChainingCount;

2> re-establish RLC entities for SRB1;

2> if the RRCRelease message with a suspendConfig has been received in response to an RRCResumeRequest or an RRCResumeRequest1:

3> stop the timer T319 if running;

3> stop timer T319a if running;

3> in the stored UE Inactive AS context:

4> replace the KgNB and KRRCint keys with the current KgNB and KRRCint keys;

4> replace the nextHopChainingCount with the value of nextHopChainingCount received in the RRCRelease message;

4> replace the cellIdentity with the cellIdentity of the cell from which the UE 102 has received the RRCRelease message;

4> if the suspendConfig contains the sl-ServingCellInfo (i.e., the UE 102 is a L2 U2N Remote UE):

5> replace the physical cell identity with the value of the sl-PhysCellId;

5> replace the C-RNTI with the value of the sl-UEIdentityRemote;

4> else:

5> replace the C-RNTI with the C-RNTI used in the cell from which the UE 102 has received the RRCRelease message;

5> replace the physical cell identity with the physical cell identity of the cell from which the UE 102 has received the RRCRelease message;

3> replace the nextHopChainingCount with the value associated with the current KgNB;

2> else:

3> store in the UE Inactive AS Context the nextHopChainingCount received in the RRCRelease message, the current KgNB and KRRCint keys, the ROHC state, the stored QoS flow to DRB mapping rules, the application layer measurement configuration, the C-RNTI used in the source PCell, G-RNTI(s)/G-CS-RNTI(s) or TMGI(s) for MBS services used in the source PCell, the cellIdentity and the physical cell identity of the source PCell, the spCellConfigCommon within ReconfigurationWithSync of the NR PS Cell (if configured) and all other parameters configured except for:

parameters within ReconfigurationWithSync of the PCell;

parameters within ReconfigurationWithSync of the NR primary and secondary cells (PSCell), if configured;

parameters within MobilityControlInfoSCG of the E-UTRA Evolved Universal Terrestrial Radio Access (E-UTRA) PSCell, if configured;

servingCellConfigCommonSIB;

sl-L2RelayUEConfig, if configured;

sl-L2RemoteUEConfig, if configured;

3> store any previously or subsequently received application layer measurement reports for which no segment, or full message, has been submitted to lower layers for transmission;

2> suspend all SRB(s) and DRB(s) and multicast MRB(s), except SRB0 and multicast MRB(s) that are configured to receive multicast in the RRC_I-NACTIVE;

2> indicate PDCP suspend to lower layers of all DRBs and multicast MRBs, except multicast MRB(s) that are configured to receive multicast in the RRC_I-NACTIVE state;

2> if the t380 is included:

3> start timer T380, with the timer value set to t380;

2> if the RRCRelease message is including the wait-Time:

3> start timer T302 with the value set to the wait-Time;

3> inform upper layers that access barring is applicable for all access categories except categories '0' and '2';

2> if T390 is running.

3> stop timer T390 for all access categories;

3> perform the actions as specified in 5.3.14.4;

2> indicate the suspension of the RRC connection to upper layers;

2> enter RRC INACTIVEstate and perform cell selection as specified in TS 38.304 [20]. UE 102 may prioritize to select the current cell if UE 102 is configured to receive multicast in the RRC_INAC-TIVE state;

1> else

2> perform the actions upon going to RRC_IDLE state as specified in 5.3.11, with the release cause 'other'.

Upon reception of the RRCResume message by the UE 102, the UE 102 resumes SRB2 (if suspended), SRB3 (if configured), all DRBs (that are suspended) and multicast MRBs, except for multicast MRBs that were configured to receive multicast in the RRC_INACTIVE state. That is, multicast MRBs that were configured to receive multicast in the RRC_INACTIVE state have not been suspended while entering into the RRC_INACTIVE state and have not been resumed while exiting RRC_INACTIVE state. An example is as follows:

5.x.y.z Reception of the RRCResume Message by the UE

The UE 102 shall:

1> resume SRB2 (if suspended), SRB3 (if configured), all DRBs (that are suspended) and multicast MRBs, except multicast MRBs that are configured to receive multicast in the RRC_INACTIVE.

Upon reception of RRCResume by the UE 102, if the RRCResume includes the fullConfig, the UE 102 performs the full configuration procedure by releasing all current dedicated radio configurations except for the MCG C-RNTI, AS security configuration associated with the master key, SRB1/SRB2 configurations, DRB/multicast MRB configurations as configured by radioBearerConfig or radioBearer-Config2, logged measurement configuration and multicast MRB configurations as configured by mbs-multicast-Inac-tiveConfig in suspendConfig (for example, multicast MRB configurations that were configured for multicast reception in the RRC_INACTIVE state). An example specification is as follows:

5.x.y.z Full Configuration

The UE 102 shall:

1> release/clear all current dedicated radio configurations except for the following:

the Master Cell group (MCG) C-RNTI;

the AS security configurations associated with the master key;

the SRB1/SRB2 configurations and DRB/multicast MRB configurations as configured by radioBearer-Config or radioBearerConfig2.

the multicast MRB configurations as configured by mbs-multicast-InactiveConfig in the RRC Release with a suspendConfig.

the logged measurement configuration;

1> for each TMGI that is part of the current UE configuration:

2> release the SDAP entity;

2> release each multicast MRB associated to the TMGI as specified in 5.3.5.6.6;

NOTE 4: This may retain the TMGI, but remove the multicast MRBs including MRB-identity of these bearers from the current UE configuration. Setup of the multicast MRBs within the AS is described in clause 5.3.5.6.7 using the new configuration. The TMGI acts as the anchor for associating the released and re-setup multicast MRB. In the AS, the multicast MRB re-setup is tantamount to a new multicast MRB setup (including new PDCP and logical channel configurations).

1> for each TMGI that is part of the current UE configuration but not added with the same TMGI in the mrb-ToAddModList:

2> if the procedure was triggered due to reconfiguration with sync:

3> indicate the release of the user plane resources for the TMGI to upper layers after successful reconfiguration with sync;

2> else:

3> indicate the release of the user plane resources for the tmgi to upper layers immediately.

When a UE 102, that is capable or configured to receive multicast in the RRC_INACTIVE, transitions from RRC_I-NACTIVE to RRC_IDLE due to RRC release signaling message from network or inactivity or release of all the multicast session(s) in the RRC_INACTIVE, the UE 102 releases the multicast MRB(s) configurations.

When the UE 102 that is capable or configured to receive multicast in the RRC_INACTIVE state, receives 'activation' for relevant multicast session(s) through group notification (for example, group paging) from network, the UE 102 restores the stored configuration of the relevant multicast MRB(s) and continues to receive multicast session in the RRC_INACTIVE state. Alternatively, when the UE 102 that is capable or configured to receive multicast in the RRC_INACTIVE state, receives 'activation' for relevant multicast session(s) through group notification (for example, group paging) from network in the RRC_INACTIVE state, then the UE 102 utilizes configuration of the relevant multicast MRB(s) as received in mbs-multicast-Inactive-Config included in SuspendConfig (i.e. through RRCRe-lease with a suspendConfig message, while the UE 102 was in the RRC_CONNECTED state) and continues to receive multicast session in the RRC_INACTIVE state. The UE 102 continues monitoring for the group notification for possible session deactivation.

When the UE 102 that is capable or configured to receive multicast in the RRC_INACTIVE state, receives deactivation for relevant multicast session(s), for example, through group notification from the network device 104, the UE 102 retains the stored configuration of the relevant multicast MRB(s) and continues to monitor for group notification for relevant TMGI(s). When the UE 102 that is capable or configured to receive multicast in the RRC_INACTIVE state, receives deactivation for relevant multicast session(s), for example, through group notification from the network device 104 in the RRC_INACTIVE state, the UE 102 retains the configuration of the relevant multicast MRB(s) as received mbs-multicast-InactiveConfig included in SuspendConfig (i.e. through RRCRelease with a suspendConfig message, while the UE 102 was in the RRC_CONNECTED state) and continues to monitor for group notification for relevant TMGI(s) for possible session activation.

When the UE 102 that is capable or configured to receive multicast in the RRC_INACTIVE state, receives release for relevant multicast session(s) for example, through group notification from the network device 104, the UE 102 again removes or discards the stored configuration of the relevant multicast MRB(s) and stops monitoring for group notification at least for relevant TMGI(s). When the UE 102 that is capable or configured to receive multicast in the RRC_INACTIVE state, receives 'release' for relevant multicast session(s), for example, through group notification from the network device 104 in the RRC_INACTIVE state, then the UE 102 removes or discards the configuration of the relevant multicast MRB(s) as received mbs-multicast-InactiveConfig included in SuspendConfig (i.e. through RRCRelease with a suspendConfig message while UE was in the RRC_CONNECTED state) and stops monitoring for group notification for relevant TMGI(s).

The UE 102, in the RRC_INACTIVE state, is only required to acquire broadcasted system information block1 (SIB1) and MBS broadcast, if the UE 102 can make this acquisition without disrupting MBS multicast data reception, i.e., the broadcast and unicast/MBS multicast beams are quasi co-located.

The UE 102 that is configured to receive multicast in the RRC_INACTIVE state, monitors for group notification in the RRC_INACTIVE state for at least one of session activation, deactivation, and release, irrespective of a paging early indication (PEI), that indicates whether there is presence of paging for the sub-group associated with the UE 102.

The embodiments disclosed herein can be implemented through at least one software program running on at least one hardware device and performing network management functions to control the network elements. The modules shown in FIGS. 1 to 3 include blocks which can be at least one of a hardware device, or a combination of hardware device and software device.

As is traditional in the field, embodiments may be described and illustrated in terms of blocks that perform a described function or functions. These blocks, which may be referred to herein as managers, units, modules, or hardware components, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may be embodied in one or more semiconductor chips, or on substrate supports such as printed circuit boards (PCBs). The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks or may be physically combined into more complex blocks without departing from the scope of the disclosure.

The memories 110 and 116 may comprise one or more volatile and non-volatile memory components which are capable of storing data and instructions of the modules of the UE 102 and the network device 104 to be executed. Examples of the memories 110 and 116 can be, but not limited to, NAND, embedded multimedia card (eMMC), secure digital (SD) cards, universal serial bus (USB), serial advanced technology attachment (SATA), and solid-state drive (SSD). The memories 110 and 116 may also include one or more computer-readable storage media. Examples of non-volatile storage elements may include magnetic hard discs, optical discs, floppy discs, flash memories, or forms of electrically programmable memories (EPROM) or electrically erasable and programmable (EEPROM) memories. The memories 110 and 116 may, in some examples, be considered a non-transitory storage medium. The term "nontransitory" may indicate that the storage medium is not embodied in a propagated signal. However, the term "nontransitory" should not be interpreted to mean that the memory modules 110 and 116 are non-movable. In certain examples, a non-transitory storage medium may store data that can change over time, such as in a random access memory (RAM) or a cache.

The embodiment disclosed herein describes systems and methods for configuring UEs for NR MBS reception in an RRC inactive state. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in, such as very high speed integrated circuit hardware description language (VHDL) another programming language, or implemented by one or more VHDL or several software modules being executed on at least one hardware device. The hardware device can be any kind of portable device that can be programmed. The device may also include means which could be for example, hardware means like for example, an ASIC, or a combination of hardware and software means, for example, an ASIC and an FPGA, or at least one microprocessor and at least one memory with software modules located therein. The embodiments described herein could be implemented partly in hardware and partly in software, or by using a plurality of CPUs.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. A method performed by a user equipment (UE) supporting a multicast and broadcast service (MBS) in a wireless communication system, the method comprising:

transmitting, to a base station, capability information indicating whether the UE supports an MBS multicast service reception in a radio resource control (RRC) inactive state;

receiving, from a base station in an RRC connected state, an RRC release message for suspending an RRC connection, wherein the RRC release message includes MBS multicast configuration information for receiving the MBS multicast service in the RRC inactive state;

based on the RRC release message, transitioning to the RRC inactive state; and receiving, from the base station, the MBS multicast service in the RRC inactive state, based on the MBS multicast configuration information, wherein the UE is configured to receive the MBS multicast service in the RRC inactive state.

2. The method of claim 1, further comprising:

suspending all MBS radio bearers (MRBs) associated with MBS multicast sessions not configured for a reception in the RRC inactive state, wherein the MBS multicast service is received via the MRBs.

3. The method of claim 1, further comprising:

receiving, from the base station, a paging message for a group notification, wherein the paging message is associated with applying the MBS multicast configuration information corresponding received in the RRC release message.

4. The method of claim 1, wherein the MBS multicast configuration information is associated with information on a cell list providing the same MBS multicast service.

5. A method performed by a base station supporting a multicast and broadcast service (MBS) in a wireless communication system, the method comprising:

receiving, from a user equipment (UE), capability information indicating whether the UE supports an MBS multicast service reception in a radio resource control (RRC) inactive state;

transmitting, to the UE, an RRC release message for suspending an RRC connection, wherein the RRC release message includes MBS multicast configuration information for an MBS multicast service in the RRC inactive state; and transmitting, to the UE in the RRC inactive state, the MBS multicast service, based on the MBS multicast configuration information, wherein the MBS multicast configuration information includes information on a cell list providing the same MBS multicast service.

6. The method of claim 5, wherein all MBS radio bearers (MRBs) associated with MBS multicast sessions not configured for the RRC inactive state are suspended, and wherein the MBS multicast service is transmitted via the MRBs.

7. The method of claim 5, further comprising:

transmitting, to the UE, a paging message for a group notification, wherein the paging message is associated with applying the MBS multicast configuration information transmitted in the RRC release message.

8. The method of claim 5, wherein the MBS multicast configuration information is associated with information on a cell list providing the same MBS multicast service.

9. A user equipment (UE) supporting a multicast and broadcast service (MBS) in a wireless communication system, the UE comprising:

a transceiver; and a controller coupled with the transceiver, and configured to:

transmit, to a base station, capability information indicating whether the UE supports an MBS multicast service reception in a radio resource control (RRC) inactive state, receive, from the base station in an RRC connected state, an RRC release message for suspending an RRC connection, wherein the RRC release message includes MBS multicast configuration information for receiving the MBS multicast service in the RRC inactive state, based on the RRC release message, transition to the RRC inactive state, and receive, from the base station, the MBS multicast service in the RRC inactive state, based on the MBS multicast configuration information, wherein the UE is configured to receive the MBS multicast service in the RRC inactive state.

10. The UE of claim 9, wherein the controller is further configured to:

suspend all MBS radio bearers (MRBs) associated with MBS multicast sessions not configured for a reception in the RRC inactive state, wherein the MBS multicast service is received via the MRBs.

11. The UE of claim 9, wherein the controller is further configured to:

receive, from the base station, a paging message for a group notification, wherein the paging message is associated with applying the MBS multicast configuration information received in the RRC release message.

12. The UE of claim 9, wherein the MBS multicast configuration information is associated with information on a cell list providing the same MBS multicast service.

13. A base station supporting a multicast and broadcast service (MBS) in a wireless communication system, the base station comprising:

a transceiver; and a controller coupled with the transceiver, and configured to:

receive, from a user equipment (UE), capability information indicating whether the UE supports an MBS multicast service reception in a radio resource control (RRC) inactive state, transmit, to the UE, an RRC release message for suspending an RRC connection, wherein the RRC release message includes MBS multicast configuration information for an MBS multicast service in the RRC inactive state, and transmit, to the UE in the RRC inactive state, the MBS multicast service, based on the MBS multicast configuration information, wherein the MBS multicast configuration information includes information on a cell list providing the same MBS multicast service.

14. The base station of claim 13, wherein all MBS radio bearers (MRBs) associated with MBS multicast sessions not configured for the RRC inactive state are suspended, and wherein the MBS multicast service is transmitted via the MRBs.

15. The base station of claim 13, wherein the controller is further configured to:

transmit, to the UE, a paging message for a group notification, wherein the paging message is associated with applying the MBS multicast configuration information transmitted in the RRC release message.

16. The base station of claim 13,
wherein the MBS multicast configuration information is associated with information on a cell list providing the same MBS multicast service.

* * * * *